(12) United States Patent
Cui et al.

(10) Patent No.: US 8,924,340 B2
(45) Date of Patent: Dec. 30, 2014

(54) METHOD OF COMPARING DATA SEQUENCES

(75) Inventors: Zhan Cui, Colchester (GB); Qiao Tang, Cardiff (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 601 days.

(21) Appl. No.: 12/593,203

(22) PCT Filed: Mar. 12, 2008

(86) PCT No.: PCT/GB2008/000863
§ 371 (c)(1),
(2), (4) Date: Sep. 25, 2009

(87) PCT Pub. No.: WO2008/117015
PCT Pub. Date: Oct. 2, 2008

(65) Prior Publication Data
US 2010/0121813 A1    May 13, 2010

(30) Foreign Application Priority Data

Mar. 27, 2007  (EP) .................................... 07251307

(51) Int. Cl.
| G06F 17/00 | (2006.01) |
| G06N 7/00 | (2006.01) |
| G06N 7/08 | (2006.01) |
| G06F 17/30 | (2006.01) |

(52) U.S. Cl.
CPC ................................ *G06F 17/30985* (2013.01)
USPC .......................................................... 706/59

(58) Field of Classification Search
None
See application file for complete search history.

(56) References Cited

U.S. PATENT DOCUMENTS

| 5,819,291 | A | 10/1998 | Haimowitz et al. |
| 7,653,545 | B1 * | 1/2010 | Starkie .......................... 704/275 |
| 2002/0049720 | A1 | 4/2002 | Schmidt |
| 2003/0023593 | A1 | 1/2003 | Schmidt |
| 2004/0122979 | A1 * | 6/2004 | Kirkland ....................... 709/247 |
| 2004/0181512 | A1 | 9/2004 | Burdick et al. |

OTHER PUBLICATIONS

"Schema matching using duplicates", Bilke et al, 2005, IEEE, pp. 69-80.*
Ntoutsi, I & Theodoridis, Y.; "Measuring and Evaluating Dissimilarity in Data and Pattern Spaces"; Database Group, Information Systems Laboratory, Department of Informatics, University of Piraeus, Greece; 5 pgs. (undated).
Lee, W. et al.; "Mining in a Data-flow Environment: Experience in Network Intrusion Detection"; Computer Science Department, Columbia University, pp. 114-124; 1999.

(Continued)

*Primary Examiner* — Kakali Chaki
*Assistant Examiner* — Luis Sitiriche
(74) *Attorney, Agent, or Firm* — Nixon & Vanderhye P.C.

(57) ABSTRACT

A method according to the present invention enables the similarity between sequences of symbols to be determined using rules generated from a dictionary-based compression scheme according to the content of the columns from databases. Pairs of symbols can replaced by rules that do not comprise a repeated combination of two symbols and where each rule occurs more than once in the sequence of symbols. The similarity of each set of rules can then be expressed numerically.

11 Claims, 1 Drawing Sheet

(56) References Cited

OTHER PUBLICATIONS

Lee, W. & Fan, W.; "Mining System Audit Data: Opportunities and Challenges"; College of Computing, Georgia, Institute of Technology, Atlanta, GA and IBM T. J. Watson Research Center, Hawthorne, NY; pp. 1-10 (undated).

International Search Report for PCT/GB2008/000863, mailed Jul. 1, 2008.

Bilke et al., "Schema Matching Using Duplicates", Data Engineering, 2005. ICDE 2005, Proceedings 21st International Conference on Tokyo, Japan Apr. 5-8, 2005, Piscataway NJ, USA, IEEE, pp. 69-80, XP010788143.

Ratinov et al., "Abbreviation Expansion in Schema Matching and Web Integration", Web Intelligence, 2004., Proceedings. IEEE/WIC/ACM International Conference on Beijing, China, Sep. 20-24, 2004, Piscataway, NJ, USA, IEEE, pp. 485-489, XP010779263.

Li Wen-Syan et al., "Semint: A Tool for Identifying Attribute Correspondences in Heterogeneous Databases Using Neural Networks", Data & Knowledge Engineering, North-Holland, vol. 33, 2000, pp. 49-84, XP001152202.

You Li et al., "Schema Matching using Neural Network", Web Intelligence, 2005, Proceedings the 2005 IEEE/WIC/ACM International Conference on Compiegne, France Sep. 19-22, 2005, Piscataway, NJ, USA, IEEE, pp. 743-746, XP010841814.

Lyttleton et al., "Mediating Between Heterogeneous Ontologies Using Schema Matching Techniques", Information Reuse and Integration, Conf., 2005, IEEE International Conference on. Las Vegas NV, USA Aug. 15-17, 2005, Piscataway, NJ, USA, IEEE, pp., 247-252, XP010834844.

\* cited by examiner

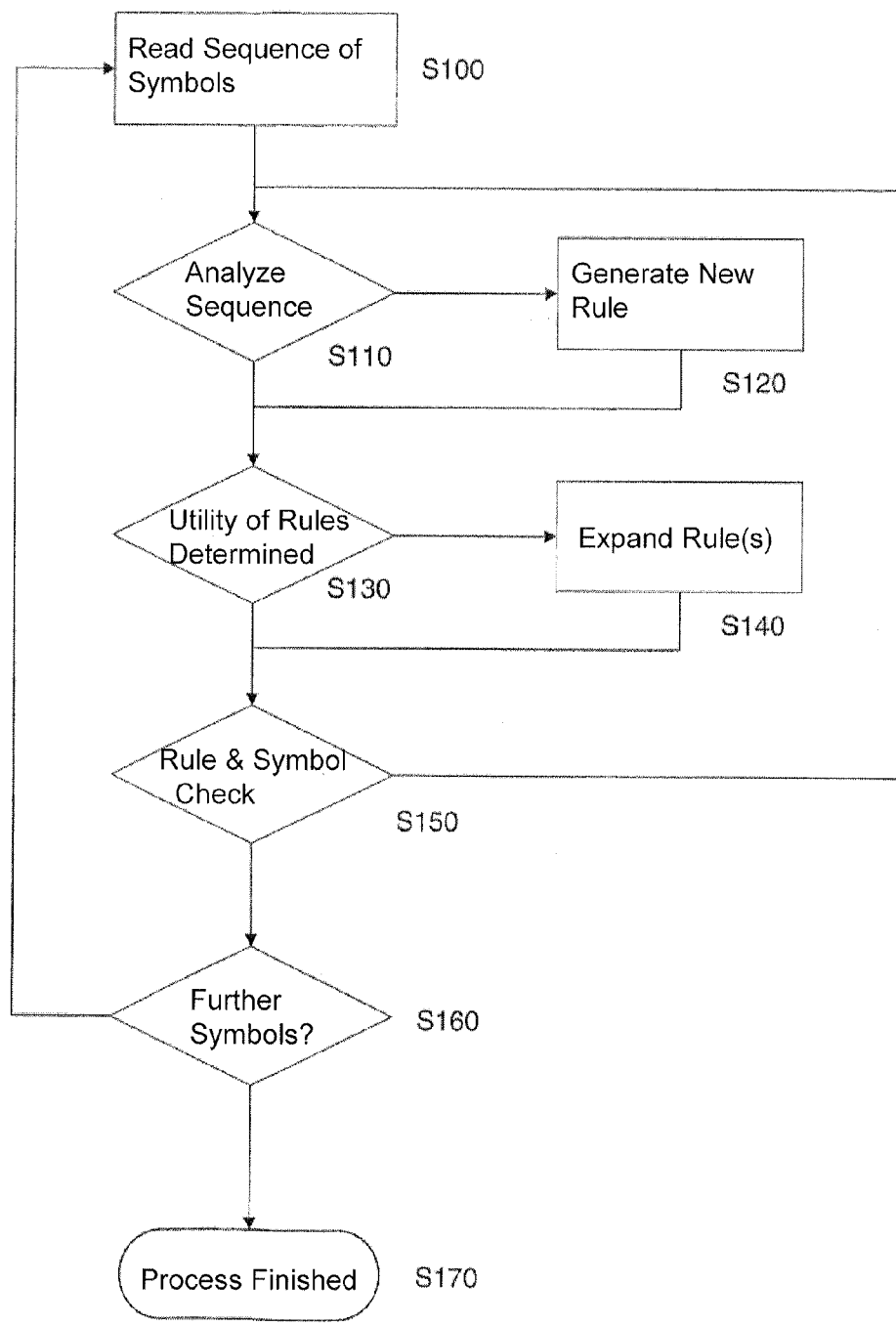

METHOD OF COMPARING DATA SEQUENCES

This application is the U.S. national phase of International Application No. PCT/GB2008/000863 filed 12 Mar. 2008, which designated the U.S. and claims priority to European Application No. 07251307.0, filed 27 Mar. 2007, the entire contents of each of which are hereby incorporated by reference.

BACKGROUND OF SUMMARY

The present invention relates to a method of comparing data sequences, and in particular to a method of comparing data sequences that allows for database schema information to be matched.

Many large organisations and businesses have a large number of databases and information sources that contain data relating to their customers, business relationships, technical data, operational data, financial performance etc. It is conventional to use data warehouses to bring together disparate and silo data sources through ETL processes, i.e., Extract, Transform and Load, so that techniques, such as, for example, data mining, can be used to establish correlations and causal connections between the different metrics and operations that are represented by the different data types. There is also a growing interest in business intelligence, in which operational data that is collected by a business operation can be used to infer or predict the tactical or strategic performance of the business. Typically, each of the different databases or information sources will have been developed for a different reason and thus will have a different data schema, which will hinder a simple correlation of the data held in the different databases or information sources. In current implementations, schema matching is typically performed manually, supported by a graphical user interface. This approach has a number of limitations: manually specifying schema matches is tedious, time-consuming, error-prone, and expensive. This is a growing problem given the rapidly increasing number of data sources and E-business to integrate. Moreover, as systems handle more complicated databases and applications, their data schema become larger, which causes an increased number of matches to be performed. Schema matching techniques are also of interest in the fields of schema integration, E-commerce, semantic query processing and the semantic web.

To give an example of a typical problem, in a database there may be a column which stores all names of employees in the company, in the order of surname followed by first name. The surname and first name are typically separated using one of commas, spaces or tabs. Also, in this database, there may be another column in a table which stores employee names in the order of the initial followed by the surname. In this case, these two forms to store employee names are literally different but semantically similar. However, schema metadata-based matching often could not discover they are all people's names. Also, this kind of similarities is important to join data across data sources as they often do not contain foreign keys between tables. For example, in one table the columns may contain the data of each employee's ID number and their billing addresses while another table may contain each employee's postal addresses and contact telephone number. By finding the similarity of each employee's-' billing addresses in the first table and each employee's postal address in the second table, these two tables could be joined so that more information can be maintained consistently. Although there are methodologies for designing consistent databases from scratch (for example, using Normal Forms), given large quantities of many separated databases and many years' legacy data, data inconsistency is a pervasive problem existing currently within warehouses of large organisations.

Current approaches include discovering similarities between different schemas manually and automatically (or semi-automatically) finding potential matches at the schema level or at the instance level. There are some disadvantages associated with these approaches.

For the manual approach, the obvious disadvantage is that this approach is time-consuming, sometimes to the extent that it falls outside the time frame allowed in any project and for daily maintenance. As a result, there is a very significant cost involved in hiring sufficient database experts to undertake the required work.

There are schema level approaches that use database schemas for schema matching. Schemas are descriptions of the structures of databases. In this approach, only schema information is exploited for schema matching. Such information includes properties of schema elements, e.g. name, description, data type, relationship type, constraints; and schema structures (see, by way of example, L Palopoli et al, "*Semi-automatic, semantic discovery of properties from database schemas*", Proc Int. Database Engineering and Applications Symp. (IDEAS), IEEE Comput, pp. 244-253, 1998, L Palopoli et al, "*An automatic technique for detecting type conflicts in database schemas*", Proc 7th Int Conf On Information and Knowledge Management (CIKM), pp. 306-313, 1998, AH Doan et al, "*Learning source descriptions for data integration*", Proc of WebDB Workshop, pp. 81-92, 2000, S Bergamaschi et al, "*Semantic integration of semistructured and structured data sources*", ACM SIGMOD Record 28(1):54-59, 1999, S Castano et al, "*Global viewing of heterogeneous data sources*". IEEE Trans Data Knowl Eng 13(2):277-297, 2001). Auxiliary information is also used for schema matching such as dictionaries, thesauri, matching rules provided by the users and previously matched schemas.

However, due to the abstractness of the description, sometimes there is no adequate information about the data to enable the relevance of columns to be judged. For example, at a schema level, sometimes, data type, length limit, data column names are not enough for judging the difference between the data in different table columns. "John Smith" and "Smith, John" are very similar at the schema level. Although, "broadband modem" and "John Smith" are not similar in terms of semantics, they are similar at the schema level, because they both can be expressed as the string type, the data length is similar and column names can be both "names" for product names and people's names. Therefore, due to the limitations discussed above, there is a need for automatically finding similar patterns in databases by using other available information as a complement, rather than by observing schema only at an abstracted level.

The instance level approach can gain better insight into the characteristics of the actual schema elements when compared with schema, level approaches, because more information is available which is not limited to the abstract data description. This is especially useful when little or no schema information is given. Typical examples of these methods reply on techniques such as linguistic characterisation, or constraint-based characteristics. Judging using linguistic characteristics is of most use when applied to text elements. For example, if many of the instances of a schema element can be found in a name database, then probably this schema element is more related to any schemas which have "name", or similar, as the name of a schema element than others which do not have.

Constraint-based characterisation is of most relevance when applied to numerical value ranges, averages or character patterns. For example, normal UK telephone numbers begin with '0' and have 11 digits in total, therefore, a judging rule which has length limit of 11, and has '0' as the first character can be generated as a constraint.

Various approaches have been proposed to perform instance matching or classification, such as methods by rules, neural networks, and machine learning technologies (see, for example, J Berlin & M Motro, "*Autoplex: automated discovery of content for virtual databases*", Proc 9th Int Conf On Cooperative Information Systems (CoopIS), Lecture Notes in Computer Science, vol. 2172, 2001, pp. 108-122, AH Doan et al, "*Learning source descriptions for data integration*", Proc of WebDB Workshop, pp. 81-92, 2000, A H Doan, P Domingos, A Halevy, "Reconciling schemas of disparate data sources: a machine learning approach", in Proc of SIGMOD, 2001, W Li & C Clifton, "*Semantic integration in heterogeneous databases using neural networks*", Proc 20th Int Conf On Very Large Data Bases, pp. 1-12, 1994, Wen-Syan Li, Chris Clifton: "SEMINT: A tool for identifying attribute correspondences in heterogeneous databases using neural networks", Data Knowl. Eng. 33(1): 49-84 (2000) & Wen-Syan Li, Chris Clifton, Shu-Yao Liu: "Database Integration Using Neural Networks: Implementation and Experiences", Knowl. Inf. Syst. 2(1): 73-96 (2000).

In these approaches, machine learning techniques are used. However, these machine learning techniques require training before patterns can be recognised to match similar patterns. The training process is often a time-consuming process, that requires a large number of training samples to be built such that the patterns can be recognised.

In these approaches, machine learning techniques are used. However, these machine learning techniques require training before patterns can be recognised to match similar patterns. The training process is often a time-consuming process, that requires a large number of training samples to be built such that the patterns can be recognised.

According to a first aspect of the present invention there is provided a method of determining one or more patterns in a sequence of symbols, wherein the method comprises the steps of: a) analysing the sequence of symbols, such that any patterns of two symbols are replaced by a rule if: i) the rule does not comprises a repeated combination of two symbols; and ii) the rule occurs more than once in the sequence of symbols.

The method may comprise the further step of: b) adding a adding symbol to the sequence of symbols; and then repeating step a). In one embodiment of the present invention step a) is repeated until no further patterns of symbols may be replaced by a rule.

This method has advantages over the known approaches to these types of problem. Significantly, a method according to the present invention could be implemented automatically as a method for monitoring databases and discovering similarity between columns without much effort from human database experts. This will give significant savings in development and maintenance time and cost. When compared with database schema comparison methods, a method according to the present invention utilises data instances, so it can more accurately reflect the patterns expressed in data, avoiding the inaccurate matching typically found in schema matching methods due to inadequate amount of schema information available. Rather than giving an exact match, a method according to the present invention uses patterns identified in the data, rather than matching the same strings. This provides a fuzzy matching feature, as the data records may not necessarily be arranged in the same order, data records may not necessarily be in the same quantity, nor are they exactly the same. An indication of similarity is determined by a value for closeness calculated by comparing rules generated from both database attributes.

According to a second aspect of the present invention there is provided a method of determining the similarity between a first data series and a second data series, wherein the first data series and the second data series have been generated from a respective first sequence of symbols and second sequence of symbols, and a similarity value is generated which indicates the similarity between the set of rules comprising the first data series and the set of rules comprising the second data series.

The similarity value may have a value of 0%, indicating that there are no rules present in the first data series that are present in the second data series. The similarity value may have a value of 100%, indicating that i) the first data series comprises the same rules as those present in the second data series; and ii) each rule present in the first data series is present the same number of times in the first data series as in the second data series.

According to a third aspect of the present invention there is provided a computer program product, comprising computer executable code for performing a method as described above.

According to a fourth aspect of the present invention there is provided an apparatus configured to perform as described above.

BRIEF DESCRIPTION OF THE DRAWINGS

The invention will be described with reference to the following Figures, which are provided by way of explanation only, in which:

FIG. 1 shows a schematic depiction of a flow chart that describes the processes involved in the identification of frequently occurring data patterns.

DETAILED DESCRIPTION OF PRESENT EXAMPLE EMBODIMENTS

The method of the present invention is based on the understanding that once important patterns in the instances of database attributes have been identified it is possible to generate rules that represent these patterns in the instances of database attributes. Following the generation of these rules, then it is possible to determine the similarities between different instances of database attributes by comparing the similarity between the rules associated with those instances.

This method can be divided into two steps. The first step is to identify frequently occurring repeated patterns from given data sources. This step is independent of specific data positions or variables. The second step is to compare the rules generated from the repeated patterns so that a similarity score can be produced for evaluation of the similarity.

FIG. 1 shows a schematic depiction of a flow chart that describes the processes involved in the identification of frequently occurring data patterns. At step S100 a sequence of symbols are read and analysed at step S110 to determine whether or not the digrams in the symbol sequence are unique (i.e. that no pair of adjacent symbols appears more than once in the sequence {see below for a more detailed explanation}). The sequence may comprise one or more symbols and/or one or more rules that represent a number of symbols. If this is the case then at step S130 the utility of the rules is determined (that is, that every rule in the sequence is used more than once {see below for a more detailed explanation}). If there are non-unique digrams in the sequence then at step S120 a new rule is generated to remove at least one pair of adjacent symbols from the sequence and the rule utility is determined at step S130.

If at step S130 it is determined that every rule in the sequence is used more than once then a further check is made at step S150 that all the rules and symbols in the sequence meet both of the above requirements (digram uniqueness and rule utility). If not all rules meet both of the requirements then the process returns to step S110; otherwise the process continues to step S160 where if there are further symbols to be read then the process returns to step S100. If all of the symbols have been read in, then the process finished at step S170. If the rule utility requirement is not met at step S130 then at step S140 the or each rule that only occurs once in the sequence is expanded so that the rule utility requirement is met. The process then continues to step S150, where a further check is made that all the rules and symbols in the sequence meet both of the above requirements.

The process described above with reference to FIG. 1 will now be described in more detail with reference to examples. Table 1 below shows an example of a sequence that comprises a single repeated rule. In the processing of the sequence, "S" indicates the start of the original input pattern, with the first rule starting with "S" always being equivalent to the original input pattern. In each sequence is processed as outlined above, with reference to FIG. 1, until a result, referred to as a grammar, is produced. For each rule, on the left side of the arrow symbol "->−" is the non-terminal sequence which can be expanded, and on the right side of the arrow symbol is a grouping of non-terminal and terminal sequences. Terminal sequences cannot be expanded any more. Rules are indicated by capital letters which are received within square brackets, to avoid potential confusion from capital letters that may be present as symbols within an input sequence.

TABLE 1

A sequence with one repetition

| Original input sequence | Input sequence represented in the system | Grammar generated |
|---|---|---|
| Abdcedc | S –> abdcedc | S –> ab[A]e[A] |
| | | [A] –> dc |

It can be seen from Table 1 that the sequence 'dc' is repeated twice and that this can be replaced with the rule [A]. As there is no digram repetition within the grammar and rule [A] is present more than once, then both the digram uniqueness and the rule utility requirements are met.

TABLE 2

A sequence with one nested repetition

| Original input sequence | Input sequence represented in the system | Grammar generated |
|---|---|---|
| abcdcedcdc | S –> abcdcedcdc | S –> ab[A][A][B] |
| | | [A] –> e[B] |
| | | [B] –> dc |

Table 2 shows a more complex example, in which the original input sequence (abcdcedcdc) can be reduced to abe[B]e[B][B], where [B] replaces dc. However, this sequence does not possess digram uniqueness and thus the sequence can be further processed to give a resulting grammar of ab[A][A][B], where [A] represents e[B].

Thus, it can be seen that any pattern(s) which appear more than once can be replaced by a production rule that generates the pattern, and this process can be continued recursively. The result is a hierarchical representation of the original sequence represented in rules. A characteristic of this step is that there is no need to provide specific data positions or variables to be monitored. This means, there is no need to give positions of information in advance so that only specific positions are monitored. This also means the monitoring is conducted in a global scale rather than just a specific position, no matter where within the sequence a repetitive pattern appear, the pattern will be recorded and relevant rule/rules will be generated. For example, given a string sequence "Ababaascb", there is no need to point that for example, $4^{th}$ position or letter "a" should be monitored, as all the letters in the sequence are monitored.

The whole pattern building process is conducted from the first symbol to the last symbol in the input sequence by feeding one symbol at a time. The process is a bottom-up process which is involved in building new rules over previously input symbols or previous created rules. However, as discussed above, two properties must always be held at all times. These two properties are digram uniqueness and rule utility. When describing the algorithm, these two properties are served as constraints. These two properties ensure that no pair of adjacent symbols appears more than once in the grammar; and that every rule is used more than once.

Suppose rule S is the top level rule that represents the whole sequence. When a new terminal symbol is observed, it is first appended to rule S. Then the newly appended symbol and its predecessor form a new digram (in this context, digram means a combination of two elements, which could be either two terminals, or one terminal and one non-terminal, or two non-terminals. If the new digram occurs elsewhere in the grammar, then the first requirement (digram uniqueness) has been violated. In this case, a new rule has to be created with the newly created digram on the right-hand side, headed by a new non-terminal. The two original digrams are replaced by a reference to this newly created non-terminal. However, in some cases, the newly created rule does not always result in a new rule. If the new digram also appears on the right-hand side of an existing rule, then no new rule is needed to be created, because this digram will be replaced by the non-terminal that heads the existing rules. An illustrative example which violates this property is shown in table 3. As in table 3, rule A, where the sequence of "ab" appears twice, violates the property one of "digram uniqueness" as "ab" is not unique in the input sequence.

TABLE 3

A grammar which violates the property of digram uniqueness

| Original input sequence | Input sequence represented in the system | Grammar generated |
|---|---|---|
| ababcababc | S –> ababcababc | S –> [A][A] |
| | | [A] –> ababc |

In this case, [A] would be represented by [B][B]c, where [B] represents ab.

At first, the right-hand side of any rule in the grammars generated will be only two symbols long, regardless of whether the symbols are terminal or non-terminal. However, longer rules will be created when a new symbol is appended to the top-level rule. Such a rule may have a non-terminal symbol before this symbol, so they will form a digram. This diagram will first create a new rule in the grammar. However, if the new rule is used only once in the grammar, then this rule will be removed and the digram on the right hand side of this rule will be attached to the rule which generates this new rule. The reason is because the new rule, which is only referenced once in the whole grammar, violates this rule utility constraint. An illustrative example that violates this property is shown below in Table 4. It can be seen that, from the rules generated, rule C and rule B are only referenced once by the other rules. Therefore, the grammar generated violates the second property of "rule utility" where each rule has to be referenced at least twice so as to improve the reusability of the generated rules.

TABLE 4

A grammar which violates the property of rule utility

| Original input sequence | Input sequence represented in the system | Grammar generated |
|---|---|---|
| abcdbcabcdbc | S –> abcdbcabcdbc | S –> [D][D] |
| | | [A] –> bc |
| | | [B] –> a[A] |
| | | [C] –> d[A] |
| | | [D] –> B[C] |

The iterative nature of the method according to the present invention will now be discussed with reference to Table 5 (shown below).

TABLE 5

A grammar generation example for input sequence "abcbbcbcbb"

| Input sequence | Grammar generated | Step Number |
|---|---|---|
| a | S –> a | (1) |
| ab | S –> ab | (2) |
| abc | S –> abc | (3) |
| abcb | S –> abcb | (4) |
| abcbb | S –> abcbb | (5) |
| abcbbc | S –> a[A]b[A] | (6) |
| | [A] –> bc | |
| abcbbcb | S –> a[B][B] | (7) |
| | [A] –> bc | |
| | [B] –> [A]b | |
| abcbbcb | S –> a[C][C] | (8) |
| | [C] –> bcb | |
| abcbbcbc | S –> a[C][C]c | (9) |
| | C –> bcb | |
| abcbbcbcb | S –> a[C][C][D] | (10) |
| | [C] –> b[D] | |
| | [D] –> cb | |
| abcbbcbcbb | S –> a[C][C][D]b | (11) |
| | [C] –> b[D] | |
| | [D] –> cb | |

It will be seen that because of the nature of the input sequence, no rule is generated until step 6, when the digram be is replaced by rule [A]. (It will be understood that it is impossible for a rule to be generated with fewer than four symbols whilst still meeting the requirements of digram uniqueness and rule utility). In step 8, the two rules previously generated in step (7) are replaced by the new rule [C], because [A] in step (7) is referenced only once in the symbol sequence, which violates the rule utility requirement. The process ends at step (11) when there are no further symbols to be inputted. It will be noticed that at each step the two requirements of digram uniqueness and rule utility are met. Furthermore, at each step, new rules are be generated in response to the newly received symbol until the first property is satisfied. Rules that do not meet the second property will be removed until the second property is satisfied. When both properties are satisfied, the next symbol will be input into the system for scanning to decide whether both properties still hold.

Once rules from two different sets of input symbol sequences have been generated, the next step is to compare them and to then produce a value that indicates the similarity between these two symbol sequence sets. This indicative value may be shown as a percentage, where 0% indicates there is no rule in the first set that is the same as the rules comprised in the second symbol set, and where 100% indicates there are exactly the same rules produced in both two sets and that for each rule, the rule is reused for the same the number of times.

A formula for determining a similarity value is defined as below, where if:

p(i) is the expanded pattern in rule (i) for one of the two input sequence sets, where i can be the index number from 1 to the number of the total pattern rules, not including the rule (0) that represents the whole symbol sequence in one set;

n(i) is the number of reference times for rule(i), let the length of the pattern p(i) as l(i); let pa) be the expanded pattern in rule (j) for the other set of the two input sequence sets, where j can be the index number from 1 to the number of the total pattern rules, not including the rule(0) and let the length of the pattern pa) as l(j);

p(i,j) is the pattern which shows in both sets, let min(p(i,j)) be the number of minimum times that the same pattern appears in both sets of p(i) and p(j), and l(i,j) as the length of the pattern occurring in both sets:

then the similarity value s can be represented as below in Equation 1, and the range of the value is between 0 and 1.

$$s = \frac{2 * \left(\sum \min(p(i, j))\right) * l(i, j)}{\sum_i n(i) * l + \sum_j n(j) * l(j)} \quad [1]$$

Note the expanded pattern in rules refer to the pattern where non-terminals have been expanded to terminals, therefore, there are no non-terminals when counting the frequency for a given rule. For example, in Table 5, step (11), there are two expanded patterns; they are "[C]->bcb" and "[D]->cb", where rule [C] has been expanded from "[C]->b[D]" to "[C]->bcb".

The reason that the similarity value provides an approximate evaluation only is that the value is calculated based on rules generated only, but without the consideration of terminals in rule(0) that represents the whole input sequence. Therefore, sometimes, although rules are the same, the number of references are the same, but if the rest of the terminal positions in rule(0) are different, the whole input sequence is still different. For example, one sequence can be "[A]b[A]c", whereas the other can be "[A]c[A]b", and all the rules in both of them have the same number of reference times, but due to the positions of "b" and "c", they are still not the same, but very similar to each other. As a result, this similarity evaluation method can only be treated as an indication.

An illustrative example for similarity evaluation between input sequences "abcdbcabcdbc" and "abcdbcbcdbc" is shown below in Table 6.

TABLE 6

| Index | Rules | Expanded Rules | Reference Count | Pattern Length |
|---|---|---|---|---|
| | | abcdbcabcdbc | | |
| 0 | S –> [A][A] | S –> abcdbcabcdbc | N/A | N/A |
| 1 | [A] –> a[B]d[B] | [A] –> abcdbc | 2 | 6 |
| 2 | [B] –> bc | [B] –> bc | 4 | 2 |
| | | abcdbcbcdbc | | |
| 0 | S –> a[A][A] | S –> abcdbcbcdbc | N/A | N/A |
| 1 | [A] –> [B]d[B] | [A] –> bcdbc | 2 | 5 |
| 2 | [B] –> bc | [B] –> bc | 4 | 2 |

Using the example set out in Table 6, the similarity score is calculated as:

$$s = 2*(4*2)/(2*6 + 4*2 + 2*5 + 4*2) = 42.11\%$$

If a method according to the present invention is to be used with all of the data that has been taken from a database column, there is a special pre-processing step that needs to taken after all of the pattern rules have been generated and before any comparison is performed.

As all the records in a column that are input to the system are connected to one another as a single consecutive symbol sequence, there may be rules that generated across records. As the records are separated using, for example, cartridge return (\n) or new line (\r) symbols, if any rules are generated from data that is extracted from across records, then the pattern on the right hand side of this rule will be separated as two patterns using "\n" and "\r" as separation symbols. Furthermore, if a rule pattern has any spaces left in the pattern, then this pattern should be separated into several shorter patterns using the space character as a separator.

If, after the two previous steps have been completed, there are some patterns with only one terminal symbol left, these patterns should be removed from all of the pattern lists. This is because single symbols will not be involved in any pattern sequence combinations. Therefore, for single symbols, the similarity calculation is similar to symbol frequency calculation, which will make the pattern matching meaningless.

It will be understood that the present invention may be implemented on conventional computing device, such as a personal computer or similar. In such a case, the invention will be implemented using computer executable code that may be supplied on physical media (such as a USB drive, CD-ROM, DVD, etc) or supplied or made available for transfer or download via a communications network.

The invention may be implemented by running computer executable code on a computer that is accessible via a communications network such that symbol sequences for comparison are transferred to the network accessible computer from a client computer such that the network accessible computer generates and returns to the client computer a sequence of rules representing the symbol sequences and/or an indication of the similarity between the symbol sequences.

What is claimed is:

1. A method of determining one or more patterns in a sequence of symbols, wherein the method comprises the steps of:
    a) analyzing the sequence of symbols using a processing system comprising a computer processor, such that a rule is generated to replace non-unique diagrams occurring in the sequence, the rule comprising one or more symbols and/or a further rule,
    wherein each rule is checked to comply with a requirement that there are multiple instances of the rule occurring in the sequence of symbols such that a rule that occurs only once in the sequence is expanded by reverting the rule to a symbol pattern originally replaced by the rule, and
    wherein step a) is repeated until no further non-unique diagrams may be replaced by a rule.

2. A method according to claim 1 comprising the further step of:
    b) adding an additional symbol to the sequence of symbols; and then repeating step a).

3. A method of determining the similarity between a first data series and a second data series, wherein the first data series and the second data series have been generated from a respective first sequence of symbols and second sequence of symbols in accordance with claim 1, and a similarity value is generated which indicates the similarity between the set of rules comprising the first data series and the set of rules comprising the second data series.

4. A method according to claim 3, wherein the similarity value has a value of 0%, indicating that there are no rules present in the first data series that are present in the second data series.

5. A method according to claim 3, wherein the similarity value has a value of 100%, indicating that
    i) the first data series comprises the same rules as those present in the second data series; and
    ii) each rule present in the first data series is present the same number of times in the first data series as in the second data series.

6. A non-transitory computer program product, comprising computer executable code for performing a method according to claim 1.

7. Apparatus configured to perform a method of determining one or more patterns in a sequence of symbols, the apparatus comprising:
    a processing system, comprising a computer processor, the processing system being configured to:
    a) analyze the sequence of symbols such that a rule is generated to replace non-unique digrams occurring in the sequence, the rule comprising one or more symbols and/or a further rule,
        wherein each rule is checked to comply with a requirement that there are multiple instances of the rule occurring in the sequence of symbols, such that a rule that occurs only once in the sequence is expanded by reverting the rule to a symbol pattern originally replaced by the rule, and
        wherein the analysis of a) is repeated until no further non-unique digrams may be replaced by a rule.

8. The apparatus of claim 7, wherein the processing system is further configured to: b) add an additional symbol to the sequence of symbols; and then repeat the analysis of a).

9. The apparatus of claim 7, wherein the processing system is further configured to:
    determine the similarity between a first data series and a second data series, wherein the first data series and the second data series have been generated from a respective first sequence of symbols and second sequence of symbols analyzed in a); and
    generate a similarity value which indicates the similarity between the set of rules comprising the first data series and the set of rules comprising the second data series.

10. The apparatus of claim 9, wherein the similarity value has a value of 0%, indicating that there are no rules present in the first data series that are present in the second data series.

11. The apparatus of claim 9, wherein the similarity value has a value of 100%, indicating that i) the first data series comprises the same rules as those present in the second data series; and
ii) each rule present in the first data series is present the same number of times in the first data series as in the second data series.

* * * * *